United States Patent Office 3,576,024
Patented Apr. 20, 1971

3,576,024
PREPARATION OF VINYLALKOXYSILANES
William H. Atwell, Midland, Mich., assignor to Dow
Corning Corporation, Midland, Mich.
No Drawing. Filed Aug. 11, 1969, Ser. No. 849,166
Int. Cl. C07f 7/04, 7/18
U.S. Cl. 260—448.8           8 Claims

ABSTRACT OF THE DISCLOSURE

The preparation of vinylalkoxysilanes which involves contacting (in a closed system or open continuous system) an alkoxy-substituted disilane with at least a stoichiometric amount of an alcohol, e.g., methanol, and an alkyne, e.g., acetylene, at a temperature of at least 175° C. The recovered vinylalkoxysilanes are particularly useful as crosslinkers and/or chain extenders for a variety of elastomers.

---

This invention relates to the preparation of vinylalkoxysilanes by contacting alkoxy-substituted disilanes with a stoichiometric amount of an alcohol and an alkyne.

Heretofore, the principal method for preparing such vinylalkoxysilanes has required the use of a catalyst, e.g., chloroplatinic acid or the like. In contrast to the aforementioned prior art method, the present method avoids the use of a catalyst thereby providing significant economic advantages as well as preventing the possibility of attendant hazards which may be encountered in the use of certain catalysts commonly employed for such purposes. In addition, it has been found that significantly greater yields are obtained when following the method described herein.

In accordance with the above, the present invention relates to a method for preparing vinylalkoxysilanes comprising
(A) Contacting in a closed system
(1) a disilane of the formula

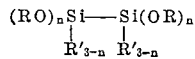

in which
R is an alkyl radical of from 1 to 6 carbon atoms inclusive,
R' is selected from the group consisting of an alkyl radical of from 1 to 6 carbon atoms inclusive, and a phenyl radical,
$n$ has a value of 1 to 2 inclusive, with
(2) At least a stoichiometric amount of an alcohol of the formula ROH and an alkyne of the formula

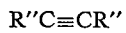

in which
R is as above defined,
R" is selected from the group consisting of an alkyl radical of from 1 to 6 carbon atoms inclusive, a phenyl radical, and a hydrogen atom,
(B) Heating the above admixture to a temperature of at least about 175° C., and
(C) Thereafter recovering the vinylalkoxysilane.

As noted above, R can be an alkyl radical of from 1 to 6 carbon atoms inclusive such as the methyl (preferred), ethyl, propyl, isopropyl, butyl, t-butyl, amyl and the hexyl radical. The corresponding alkoxy radical on the disilane (1) can therefore be the methoxy (preferred), ethoxy, propoxy, isopropoxy, butoxy, amyloxy, and the hexoxy radical.

R' can be an alkyl radical of from 1 to 6 carbon atoms inclusive as illustrated for R above or a phenyl radical and R" may be an alkyl radical of from 1 to 6 carbon atoms as illustrated for R above, a phenyl radical, or a hydrogen atom, and preferably R" is the hydrogen.

$n$ may, of course, have a value of 1 or 2.

By the term "closed system" one merely means that the reaction is conducted under conditions whereby the reaction is not open to the atmosphere and thus, the reaction is necessarily carried out under pressure which is generated and determined by the particular temperature selected. This is readily accomplished by means of a sealed ampule or a metal pressure vessel.

It is necessary that the reaction be conducted at a temperature of about 175° C. since at lower temperatures the reaction is not initiated or proceeds at such a slow rate that it is in essence impractical. For purposes of the present invention, it has been found that a temperature of about 200° C. to 250° C. is particularly preferable.

This invention also relates to a method for preparing the vinylalkoxysilanes via the aforementioned procedure with the exception that the reaction is carried out in a continuous open system at a temperature of at least about 350° C.

By the term "continuous open system" one merely means that the reaction is conducted under conditions whereby the reactants are passed continuously to a heated tube or the like under atmospheric pressure.

Under this system it is necessary that the reaction be conducted at a temperature of at least about 350° C. and preferably from about 400° C. to about 450° C.

Regardless of the system selected, a temperature of 500° C. should not be exceeded because it introduces the possibility of pyrolysis thereby substantially decreasing the yields of the vinylalkoxysilanes.

Under either system, the order of contacting the ingredients (1) and (2) is unimportant and any convenient technique can be used. However, it is important that the disilane (1) and the mixture (2) be simultaneously heated in order to achieve the desired objectives.

With respect to the alcohol and alkyne (2), at least a stoichiometric amount should be employed. An excess of the alcohol is preferred since if favors higher yields of the vinylalkoxysilanes.

The following examples are illustrative only and are not intended to limit the invention which is properly delineated in the appended claims.

EXAMPLE 1

Ten and one-half grams (0.05 mol) of the disilane

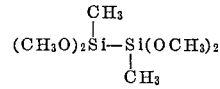

and 5.4 grams (0.1 mol) of the dimethylacetylene and 3.2 grams (0.1 mol) of methanol were sealed in an ampule and heated at 200° C. for 8 to 10 hours. Subsequent to cooling, the excess reagents and by-produced

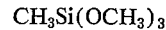

were removed by distillation means. Continued distillation provided 3.5 grams (44%) of a vinylalkoxysilane of the formula

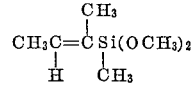

The structure was characterized by infrared, n.m.r., and mass spectral analyses as well as by methylation to the known structure,

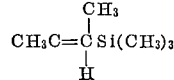

EXAMPLE 2

Twenty-five and nine-tenths grams (0.145 mol) of the disilane

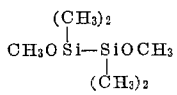

and 23.5 grams (0.44 mol) of dimethylacetylene and 13.9 grams (0.44 mol) of methanol were heated at 225° C. for 18 to 20 hours. Distillation provided 7.9 grams (38%) of a vinylalkoxysilane of the formula

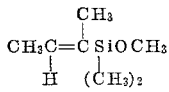

The structure was characterized by infrared, n.m.r., and mass spectral analyses as well as by methylation to the known structure,

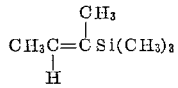

EXAMPLE 3

Twenty-one grams (0.1 mol) of the disilane

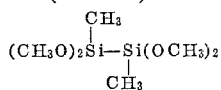

and 10.8 grams (0.2 mol) of dimethylacetylene and 3.2 grams (0.1 mol) of methanol were passed (5 ml./hour) through a quartz tube at 400° C. G.l.p.c. analysis showed complete utilization of the disilane and the formation (31.0 area percent) of a vinylalkoxysilane of the formula

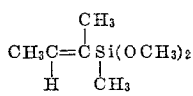

EXAMPLE 4

To 21.0 grams (0.1 mol) of the disilane

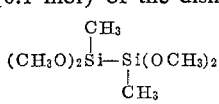

3.2 grams (0.1 mol) of methanol was added at a rate of 10 ml./hour through a quartz tube heated to 400° C. Simultaneously, 25 ml./hour of acetylene was introduced. G.l.p.c. analysis of the reaction admixture showed complete consumption of the disilane and the formation (22.0 area percent) of a vinylalkoxysilane of the formula

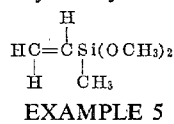

EXAMPLE 5

Seventeen and eight-tenths (0.1 mol) grams of the disilane

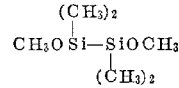

and a mixture of 10.8 grams (0.2 mol) of dimethylacetylene and 3.2 grams (0.1 mol) of methanol were passed (5.0 ml./hour) through a heated (400° C.) quartz tube. G.l.p.c. analysis of the reaction admixture showed total utilization of the disilane and the formation (44.3 area percent) of a vinylalkoxysilane of the formula

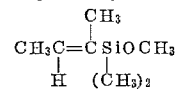

EXAMPLE 6

Nineteen grams (0.1 mol) of the disilane

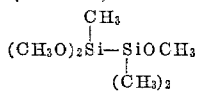

and 11.0 grams (0.2 mol) of dimethylacetylene and 3.2 grams (0.1 mol) of methanol were passed (5.0 ml./hour) through a quartz tube at a temperature of 400° C. G.l.p.c. analysis showed complete consumption of the disilane and the formation (20.5 and 19.7 area percent respectively) of vinylalkoxysilanes of the formulae

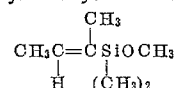

and

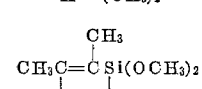

EXAMPLE 7

When the materials indicated below were substituted for the materials of Example 1, the following vinylalkoxysilanes were produced:

| Disilane | Alcohol | Alkyne | Vinylalkoxysilane |
|---|---|---|---|
| (A) 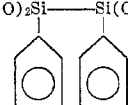 | Methanol | Dimethylacetylene | 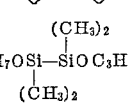 |
| (B) 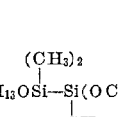 | CH₃CH₂CH₂OH | do | 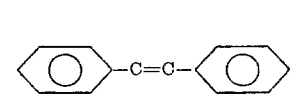 |
| (C) 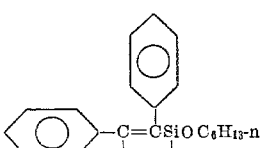 | n-C₆H₁₃OH | ⟨O⟩—C=C—⟨O⟩ | 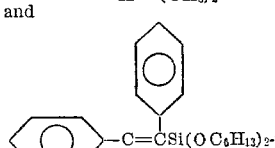 |

EXAMPLE 8

When the materials of Example 7 were substituted for the materials of Example 3, equivalent results were obtained.

That which is claimed is:

1. A method for preparing vinylalkoxysilanes comprising
   (A) contacting in a closed system
      (1) a disilane of the formula

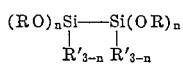

in which
         R is an alkyl radical of from 1 to 6 carbon atoms inclusive,
         R' is selected from the group consisting of an alkyl radical of from 1 to 6 carbon atoms inclusive, and a phenyl radical,
         $n$ has a value of 1 to 2 inclusive, with
      (2) at least a stoichiometric amount of an alcohol of the formula ROH and an alkyne of the formula R"C≡CR", in which
         R is as above defined,
         R" is selected from the group consisting of an alkyl radical of from 1 to 6 carbon atoms inclusive, a phenyl radical, and a hydrogen atom,
   (B) heating the above admixture to a temperature of at least about 175° C., and
   (C) thereafter recovering the vinylalkoxysilane.

2. The method as recited in claim 1 in which the disilane (1) is of the formula

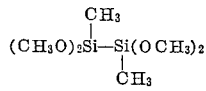

the alcohol (2) is methanol, and the alkyne (2) is dimethylacetylene.

3. The method as recited in claim 1 in which the disilane (1) is of the ofrmula

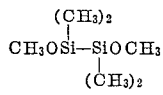

the alcohol (2) is methanol, and the alkyne (2) is dimethylacetylene.

4. The method as recited in claim 1 in which the disilane (1) is of the formula

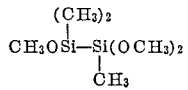

the alcohol (2) is methanol, and the alkyne (2) is dimethylacetylene.

5. A method for preparing vinylalkoxysilanes comprising
   (A) contacting in a continuous open system
      (1) a dislane of the formula

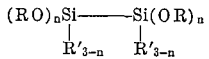

in which
         R is an alkyl radical of from 1 to 6 carbon atoms inclusive,
         R' is selected from the group consisting of an alkyl radical of from 1 to 6 carbon atoms inclusive, and a phenyl radical,
         $n$ has a value of 1 to 2 inclusive, with
      (2) at least a stoichiometric amount of an alcohol of the formula ROH and an alkyne of the formula R"C≡CR", in which
         R is as above defined,
         R" is selected from the group consisting of an alkyl radical of from 1 to 6 carbon atoms inclusive, a phenyl radical, and a hydrogen atom,
   (B) heating the above admixture to a temperature of at least about 350° C., and
   (C) thereafter recovering the vinylalkoxysilane.

6. The method as recited in claim 5 in which the disilane of the formula

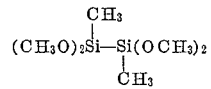

the alcohol (2) is methanol, and the alkyne (2) is acetylene.

7. The method as recited in claim 5 in which the disilane is of the formula

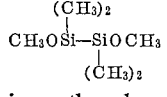

the alcohol (2) is methanol, and the alkyne (2) is acetylene.

8. The method as recited in claim 5 in which the disilane (1) is of the formula

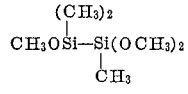

the alcohol (2) is methanol, and the alkyne (2) is acetylene.

References Cited
UNITED STATES PATENTS

| | | | |
|---|---|---|---|
| 2,881,197 | 4/1959 | Kuriyagawa et al. | 260—448.8R |
| 3,478,079 | 11/1969 | Atwell | 260—448.8R |

TOBIAS E. LEVOW, Primary Examiner

P. F. SHAVER, Assistant Examiner